US012644804B2

(12) United States Patent
Musat

(10) Patent No.: US 12,644,804 B2
(45) Date of Patent: Jun. 2, 2026

(54) TAMPER FOR EMBEDDING TISSUE SAMPLES

(71) Applicant: Leavitt Medical, Inc., Lehi, UT (US)

(72) Inventor: Sorin Musat, Bucharest (RO)

(73) Assignee: Leavitt Medical, Inc., Lehi, UT (US)

( * ) Notice: Subject to any disclaimer, the term of this patent is extended or adjusted under 35 U.S.C. 154(b) by 564 days.

(21) Appl. No.: 18/298,912

(22) Filed: Apr. 11, 2023

(65) Prior Publication Data

US 2023/0324265 A1 Oct. 12, 2023

Related U.S. Application Data

(60) Provisional application No. 63/329,972, filed on Apr. 12, 2022.

(51) Int. Cl.
*G01N 1/31* (2006.01)
*G01N 1/36* (2006.01)

(52) U.S. Cl.
CPC .................. *G01N 1/31* (2013.01); *G01N 1/36* (2013.01); *G01N 2001/366* (2013.01)

(58) Field of Classification Search
CPC .......... B65D 1/0207; G01N 1/31; G01N 1/36; G01N 2001/366
See application file for complete search history.

(56) References Cited

U.S. PATENT DOCUMENTS

| | | | |
|---|---|---|---|
| 2002/0037269 A1 | 3/2002 | Liotta et al. | |
| 2008/0056820 A1 | 3/2008 | Hall et al. | |
| 2009/0214295 A1 | 8/2009 | Lesche | |
| 2012/0107922 A1 | 5/2012 | Ooms et al. | |
| 2021/0057793 A1* | 2/2021 | Hendriksen | H01M 10/659 |
| 2022/0064511 A1* | 3/2022 | Nielsen | C09K 5/066 |
| 2022/0074828 A1 | 3/2022 | Lee | |
| 2023/0165407 A1* | 6/2023 | O'Donoghue | A47J 43/0716 |
| | | | 366/120 |

FOREIGN PATENT DOCUMENTS

| | | | |
|---|---|---|---|
| JP | 05059220 | 3/1993 | |
| KR | 20080072172 A * | 8/2008 | B41B 1/02 |

OTHER PUBLICATIONS

Nam (KR-20080072172-A) English translation (Year: 2025).*
International Search Report and Written Opinion for International Application No. PCT/US2023/018208, mailed Jul. 19, 2023, 11 Pages.

* cited by examiner

*Primary Examiner* — Jennifer Wecker
*Assistant Examiner* — Jonathan Bortoli
(74) *Attorney, Agent, or Firm* — ALG Intellectual Property, LLC

(57) ABSTRACT

A tamper for making paraffin blocks for histology may include a pliable tamper head and a handle. The handle may be permanently or removably attached to the tamper by using screws, magnets, or the like. The tamper may be made from a pliable material, such as a silicone rubber, with improved thermal transfer and high latent heat. In use, the tamper may be warmed in advance to a working temperature by placing the tamper on a hot plate of the embedding station or on a dedicated smaller hot plate. Alternatively, the tamper may be heated with an electric resistive element, a thermo-electric device, or an electric induction coil.

17 Claims, 6 Drawing Sheets

200

A

210

A

200

210

214

216

212

218

500

Mixing a silicone rubber with a phase change material to form a
tamper head
502

Coupling a handle to the tamper head
504

600

Heat a tamper head
602

↓

Add an initial amount of molten wax to an embedding mold
604

↓

Place a tissue sample in the embedding mold over
or in the molten wax
606

↓

Position the heated tamper head over the tissue sample
608

↓

Cool the embedding mold
610

TAMPER FOR EMBEDDING TISSUE SAMPLES

CROSS REFERENCE TO RELATED APPLICATION

This application claims the benefit of U.S. Provisional Application No. 63/329,972, titled "TAMPER FOR EMBEDDING TISSUE SAMPLES," filed 12 Apr. 2022, the disclosure of which is incorporated, in its entirety, by this reference.

BRIEF DESCRIPTION OF THE DRAWINGS

The accompanying drawings illustrate a number of example embodiments and is a part of the specification. Together with the following description, these drawings demonstrate and explain various principles of the present disclosure.

Figure 1:
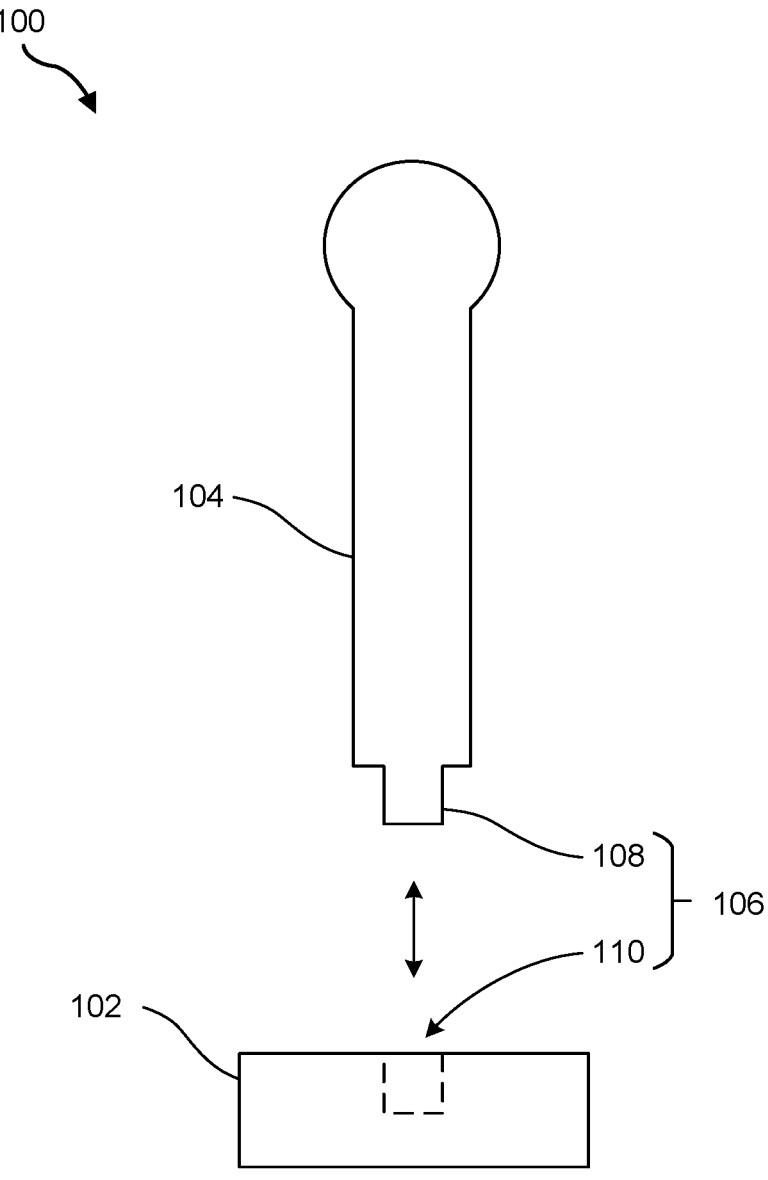
FIG. 1. is a side view of a tamper for embedding tissue samples, including a tamper head and a handle, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The following detailed description relates to at least one embodiment of the present disclosure. The description is not to be taken in a limiting sense but is made merely for the purpose of illustrating the general principles of the disclosure.

Current tamping devices (also referred to as "tampers") that are used in the histology profession include heated forceps or small metal tamping devices. The purpose of tamping devices is to maintain the processed (dehydrated and infiltrated with paraffin) tissue fragment(s) in the desired orientation and position during paraffin solidification (also referred to as "embedding") for generating paraffin blocks that will result in tissue sections representative of the tissue within. When embedding multiple small tissue fragments, improved quality results when the tissue fragments are oriented at the same depth within the paraffin block for obtaining tissue sections representative for all of them.

Using forceps typically does not allow placement of large numbers of small, processed tissue samples because the paraffin may solidify quickly from the bottom up in the mold used for creating the block. As a result, the tissue fragments will solidify in layers, the last ones placed in the mold being deeper within the thickness of the resulting paraffin block. This can result in incomplete sections and/or excessive depletion of some of the samples until a full, representative tissue section is obtained, decreasing the total number of good sections attainable for a precise and complete medical diagnostic.

The use of solid tampers made from metals that are good heat conductors and compatible with materials used in a histology lab may improve the embedding of multiple small tissue fragments. Metals used traditionally for the production of histology tampers are aluminum and copper alloys. Since both aluminum and copper alloys quickly lose heat, and in order to prevent premature solidification of paraffin during the preparation of tissue blocks, it is customary to pre-heat metal tampers to temperatures 6-10 degrees Celsius higher than the melting point of paraffin. This can be quite uncomfortable for the operator, and potentially damages the integrity of the tissue sample.

Histology paraffins usually have a melting temperature anywhere between 42 to 52 degrees Celsius ("soft paraffins"), 52 to 58 degrees Celsius ("regular paraffins"), and 60 to 68 degrees Celsius ("hard paraffins"). For good block sectioning, the hardness of the paraffin may be selected to be as close as possible to the hardness of the tissue within the block. Softer paraffins are mainly used for infiltration only (e.g., not for preparing paraffin blocks when a harder paraffin is employed), while the hard varieties (e.g., having over 60 degrees Celsius melting temperature) are reserved for dense, hard tissues (e.g., bone, cartilage, etc.). However, many histology laboratories use paraffins with a melting temperature of 56-58 degrees Celsius ("universal paraffin") for both infiltration and paraffin block casting.

Thus, in most histology laboratories, hot plates and tampers are typically heated to 62-65 degrees Celsius.

Often, the processed tissue fragments are brittle and of different thicknesses. Tamping such tissues with a solid tamper might not achieve desirable alignment and/or may result in tissue breakage.

Current approaches typically limit the number of tissue fragments embedded in paraffin in a single block to address such difficulties.

In the example embodiments described below, the tamper may include a tamper head created from a soft addition- or condensation-silicone rubber material. Thermal properties of the tamper may be improved by addition of a phase change material (e.g., for increasing latent heat), a powdered metal, a ceramic material, and/or a graphite material to the silicone rubber material for increasing heat transfer.

The silicone rubber material may be configured or selected to withstand exposure to all chemicals that might be expected to clean and disinfect materials and devices used in histology labs. In addition, the silicone rubber material may be resistant to adhering to other materials (e.g., tissue samples, paraffin wax, etc.), thus facilitating the creation of good quality tissue blocks.

The phase change material can be or include a fatty acid (e.g., caprylic acid, capric acid, lauric acid, myristic acid, palmitic acid, stearic acid, arachidic acid, behenic acid, lignoceric acid, cerotic acid, etc.), a mixture (e.g., a eutectic mixture) of two or more fatty acids, a wax material, or a combination thereof. In the case of a wax material, the wax material may be or include a natural wax (e.g., beeswax, carnauba wax, etc.) or a synthetic wax (e.g., an alkane, a paraffin, etc.). One or more of these phase change materials can be combined with a silicone rubber material at appropriate ratios to create a phase change material with a transition temperature aptly suited for a melting/solidifying temperature used for making the paraffin blocks.

For inhibiting leakage or outgassing of the phase change material during the repeated heating and cooling cycles, the phase change material can be encapsulated in a polymer material and/or absorbed in a porous matrix, such as expanded graphite.

Example metals that can be used in powdered form for increasing heat transfer properties of the composite tamper head may include aluminum, copper, silver, etc., and combinations or alloys thereof.

Example ceramics that can be used in powdered form for increasing heat transfer properties of the composite tamper are oxides, nitrides, carbides, and borides, such as polycrystalline diamond ceramics, aluminum nitride, beryllium oxide, silicon nitride, silicon carbide, etc.

Optionally, a tamper head according to embodiments of the present disclosure can be made from different layers of silicone rubber that are altered/enhanced specifically for improving their mechanical and/or thermal properties. For example, a tamper head may include a lower layer with enhanced thermal conductivity at the bottom (e.g., where the tamper contacts the tissue sample(s) during use), a core with high latent heat properties, and a peripheral layer with low thermal conductivity for the comfort of the users as well as for delaying cooling (which may benefit from additional heating to the operating temperature).

Optionally, a handle coupling may be included in or on the tamper head for connecting and disconnecting different tamper heads and/or handles to each other. For example, a magnet can be positioned within or on the tamper. In another example, tamper heads and handles may be removably connected to each other via a snap fitting, with a screw interface, etc. This way, a single handle can be used for different types/sizes of tampers, depending on the application. Likewise, a variety of different handles (e.g., different handle sizes, shapes, and/or types) can be used with a single tamper head.

A technician may use the soft conforming tamper head for flattening and maintaining in position the processed tissue sample during the creation of the paraffin blocks without having to apply a great force and with a lower risk of cracking or breaking apart fragile biological specimens.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1. is a side view of a tamper 100 for embedding tissue samples, including a tamper head 102 and a handle 104, according to at least one embodiment of the present disclosure.

As noted above, the tamper head 102 may be pliable (e.g., conformable) when the tamper 100 is pressed against an object, such as against one or more tissue samples within an embedding mold. The tamper head 102 may be formed of a material that is pliable at the operating temperatures of the tamper 100 to inhibit damaging the tissue sample(s). For example, the tamper head 102 may include a silicone rubber material or the like.

The tamper head 102 may also include one or more materials for improving thermal properties thereof. For example, the tamper head 102 may include a phase change material mixed into the silicone rubber material. The phase change material may include one or more fatty acids (e.g., caprylic acid, capric acid, lauric acid, myristic acid, palmitic acid, stearic acid, arachidic acid, behenic acid, lignoceric acid, cerotic acid, or a mixture thereof) or wax materials (e.g., a natural wax material or a synthetic wax material).

Within the silicone rubber material, the phase change material may be encapsulated in a polymer material and/or absorbed in a porous matrix (e.g., expanded graphite) to inhibit (e.g., prevent) leakage or outgassing of the phase change material during the repeated heating and cooling cycles.

In additional examples, at least a portion of the tamper head 102 may include a metal material (e.g., aluminum material, a copper material, a silver material, combinations thereof, or alloys thereof), a ceramic material (e.g., an oxide material, a nitride material, a carbide material, a boride material, a polycrystalline diamond material, etc.), or a graphite material, such as in powdered form, to improve a thermal conductivity of the tamper head 102.

The tamper head 102 may have a variety of different sizes, shapes, and material compositions to be customized for different situations. For example, one tamper head 102 may be relatively small for providing visibility when a small tissue sample is being embedded, or for use with a small embedding mold. Another tamper head 102 may be relatively large for use with a large embedding mold, or to hold multiple tissue samples in position during the embedding process. Similarly, different tamper heads 102 may have different material compositions to exhibit unique thermal and/or physical properties, such as for use with different types of tissue and/or different types of paraffin waxes.

The handle 104 may be shaped and sized for grasping by a user. In some examples, at least a portion of the handle 104 may be formed of a thermally insulating material (e.g., polymer, wood, etc.) to reduce a risk that heat from the tamper head 102 will be transferred to the user's skin, which would otherwise cause discomfort. The handle 104 may come in a variety of shapes and sizes such that different users may use different respective handles 104 according to personal preferences, hand sizes, etc.

A handle coupling 106 may be used to removably couple the handle 104 to the tamper head 102. The handle coupling 106 may enable a single handle 104 to be used with a variety of different tamper heads 102, such as tamper heads 102 of different sizes and/or material compositions.

The handle coupling 106 may take any one of a variety of configurations. For example, as shown in FIG. 1, the handle coupling 106 may include an extension 108 extending away from a lower end of the handle 104 and a complementary receptacle 110 in the tamper head 102. Alternatively, the tamper head 102 may include an extension and the handle may include a complementary receptacle. In another example, the handle 104 may include a shaft with threads and the tamper head 102 may include a complementary tapped hole, such that the handle 104 may be screwed into the tamper head 102. In additional examples, the handle 104 may include a receptacle sufficiently large to at least partially surround a periphery of the tamper head 102. In yet further examples, other types of handle couplings 106 may be used, such as a hook-and-loop fastener, one or more screws, a temporary adhesive, or the like.

Figure 2:
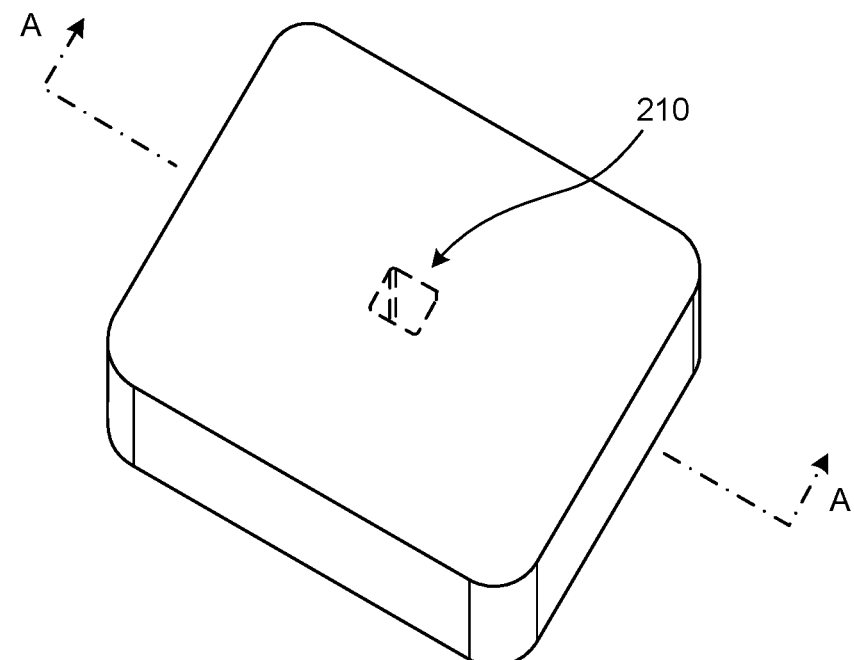
FIG. 2 is a perspective view of a tamper head, according to at least one embodiment of the pressure disclosure.
Figure 3:
FIG. 3 is a cross-sectional side view of the tamper head of FIG. 2, taken at line A-A of FIG. 2, according to at least one additional embodiment of the present disclosure.
Figure 3:
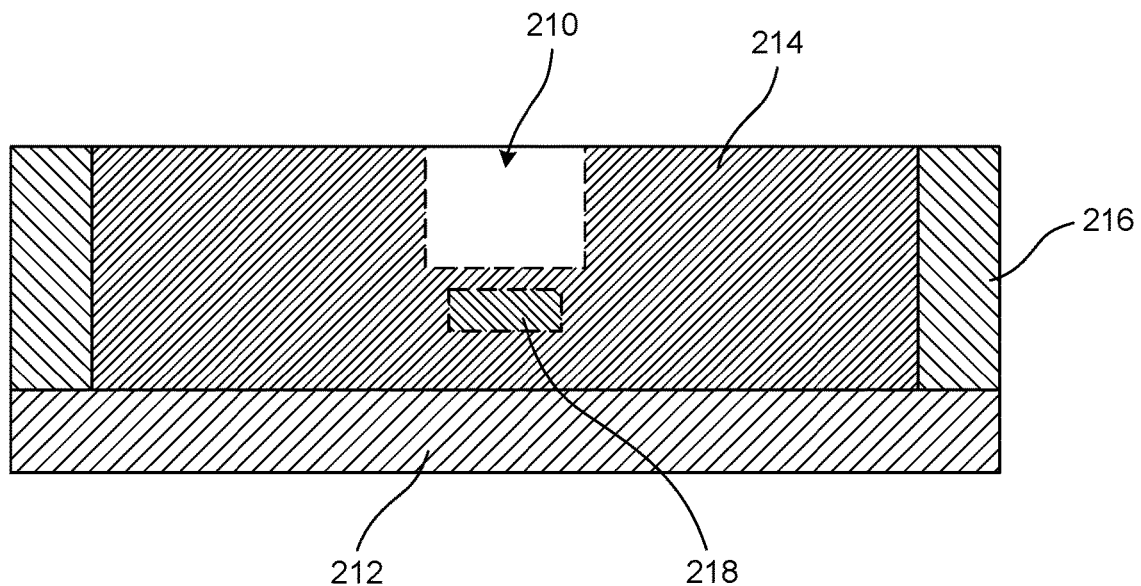

FIG. 2 is a perspective view of a tamper head 200, according to at least one embodiment of the pressure disclosure. FIG. 3 is a cross-sectional side view of the tamper head 200 of FIG. 2, taken at line A-A of FIG. 2, according to at least one additional embodiment of the present disclosure The tamper head 200 may be used as, or in place of, the tamper head 102 discussed above with reference to FIG. 1. Thus, in at least some respects, the tamper head 200 of FIG. 2 may have the same or similar features as the tamper head 102 of FIG. 1. For example, the tamper head 200 may be formed of a material that is pliable, such as a silicone rubber material. The material of the tamper head 200 may also include a phase change material (e.g., a fatty acid or wax material) and/or a thermally conductive material (e.g., a powdered metal, ceramic, or graphite material) mixed into the silicone rubber material for improved thermal properties (e.g., for increased latent heat, for increased heat conductivity, etc.). Optionally, the tamper head 200 may include a receptacle 210 as part of a handle coupling.

As illustrated in FIG. 3, the tamper head 200 may include different layers and regions for improved mechanical and/or thermal properties. For example, the tamper head 200 may include a lower layer 212, a core 214, and a peripheral layer 216. The lower layer 212, which may be the part of the tamper head 200 that contacts tissue samples during an embedding process, may exhibit a first, relatively high thermal conductivity (e.g., higher than the core 214 and/or peripheral layer 216). The lower layer 212 may exhibit the high thermal conductivity by including a higher weight percentage of thermally conductive material, such as metal, ceramic, or graphite material. This high thermal conductivity may facilitate (e.g., accelerate) heating of the tamper head 200 to a working temperature. The core 214 may exhibit a relatively high latent heat property (e.g., higher than the lower layer 212 and/or peripheral layer 216), such as to hold heat in the tamper head 200 to inhibit the loss of heat as the tamper head 200 is moved from a hot plate to an embedding mold for use. The core 214 may exhibit the high latent heat property by including a higher weight percentage of a phase change material. The peripheral layer 216 may exhibit a second, relatively low thermal conductivity (e.g., lower than the lower layer 212 and/or core 214), such as to inhibit loss of heat through the peripheral region of the tamper head 200. The peripheral layer 216 may exhibit the low thermal conductivity by including a lower weight percentage of a thermally conductive material.

In some examples, mechanical properties of the lower layer 212, core 214, and/or peripheral layer 216 may also differ from each other. For example, the lower layer 212 may be relatively more pliable than the core 214, such as to enable the lower layer 212 to conform around, and inhibit damage to, tissue samples. The core 214 may, in turn, be more rigid than the lower layer 212, such as to improve an ability to securely couple to a corresponding handle.

As illustrated in FIG. 3, the tamper head 200 may optionally include a magnetic material 218 (e.g., a permanent magnet) and/or a magnetically sensitive material (e.g., a ferromagnetic material) to improve a coupling with a corresponding handle. The corresponding handle may also include a magnetic material and/or magnetically sensitive material such that the handle and tamper head 200 may be magnetically attracted to each other when the handle is engaged with the tamper head 200. This magnetic attraction may help secure and/or orient the handle and tamper head 200 relative to each other.

Referring again to FIG. 2, the tamper head 200 may have a generally rectangular (e.g., square, squircle, rounded square, rounded rectangle) prismatic shape. However, the present disclosure is not so limited. In additional examples, the tamper head 200 may have a cylindrical shape, a bulbous shape, a hemispherical shape, or any other shape suitable for tamping tissue samples during an embedding process.

Figure 4:
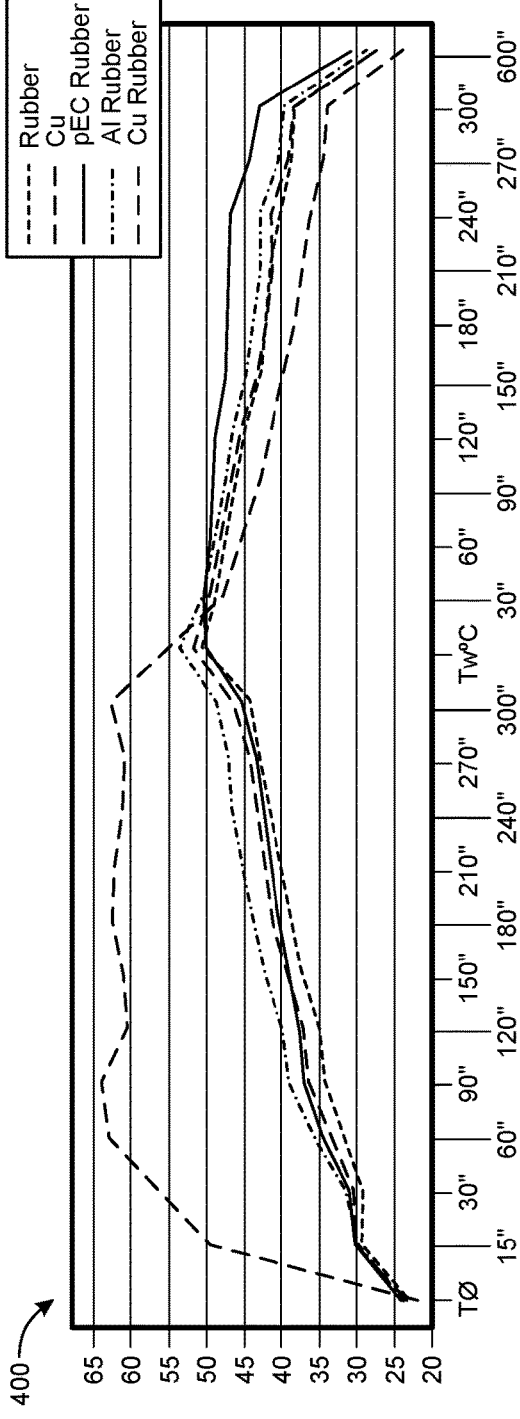
FIG. 4 is a plot of temperature measurements of different materials for a tamper head that were heated to a working temperature and allowed to cool, according to embodiments of the present disclosure.

FIG. 4 is a plot 400 of temperature measurements of different materials for a tamper head that were heated to a working temperature and allowed to cool, according to embodiments of the present disclosure. A horizontal axis of the plot 400 shows the time, in seconds, from an initial time TO when the materials were exposed to heat until a working temperature Tw was reached. The horizontal axis of the plot 400 also shows the time, in seconds, from when the working temperature Tw was reached and the materials were allowed to cool at ambient temperature. A vertical axis of the plot 400 shows the temperature in degrees Celsius.

The lines of the plot 400 represent the observed temperatures of a metallic copper material, a rubber material with no additives, rubber with paraffin and expanded carbon (e.g., graphite) additives, rubber with aluminum additives, and rubber with copper additives.

As shown in the plot 400, the rubber with paraffin and expanded carbon additives heated up at a similar rate to other materials, including rubber with no additives. However, the rubber with paraffin and expanded carbon additives held a higher temperature during the cooling phase than all the other materials. This heat retention property of the rubber with paraffin and expanded carbon additives may facilitate use of the material in tamper heads for histopathology embedding, since the tamper head would be able to retain heat and be useful for longer. This heat retention may enable heating the tamper head to the working temperature or only slightly above, rather than significantly above working temperature, which may reduce a chance of injury to a user and/or damage to the tissue samples.

Figure 5:
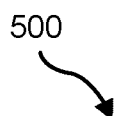
FIG. 5 is a flow chart illustrating a method of forming a tamper for embedding tissue samples, according to at least one embodiment of the present disclosure.
Figure 5:
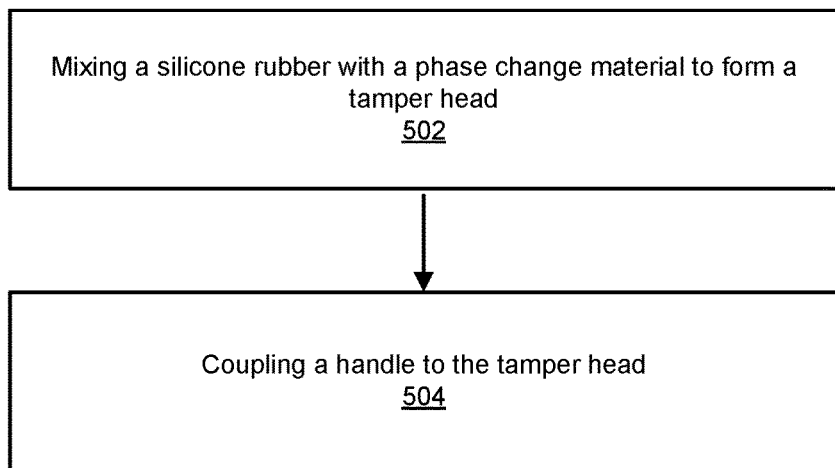

FIG. 5 is a flow chart illustrating a method 500 of forming a tamper for embedding tissue samples, according to at least one embodiment of the present disclosure. At operation 502, a silicone rubber material may be mixed with a phase change material, such as any of the phase change materials discussed above, to form a tamper head.

At operation 504, a handle may be coupled (e.g., removably coupled) to the tamper head using a handle coupling, such as any of the handle couplings discussed above.

In some examples, additional operations may be performed. For example, a metal material, ceramic material, and/or a graphite material may also be mixed into the silicone rubber material. The tamper head may be formed to have various layers, such as a lower layer exhibiting a high heat conductivity, a core exhibiting a high latent heat, and a peripheral layer exhibiting a low heat conductivity, as described above with reference to FIG. 3.

Figure 6:
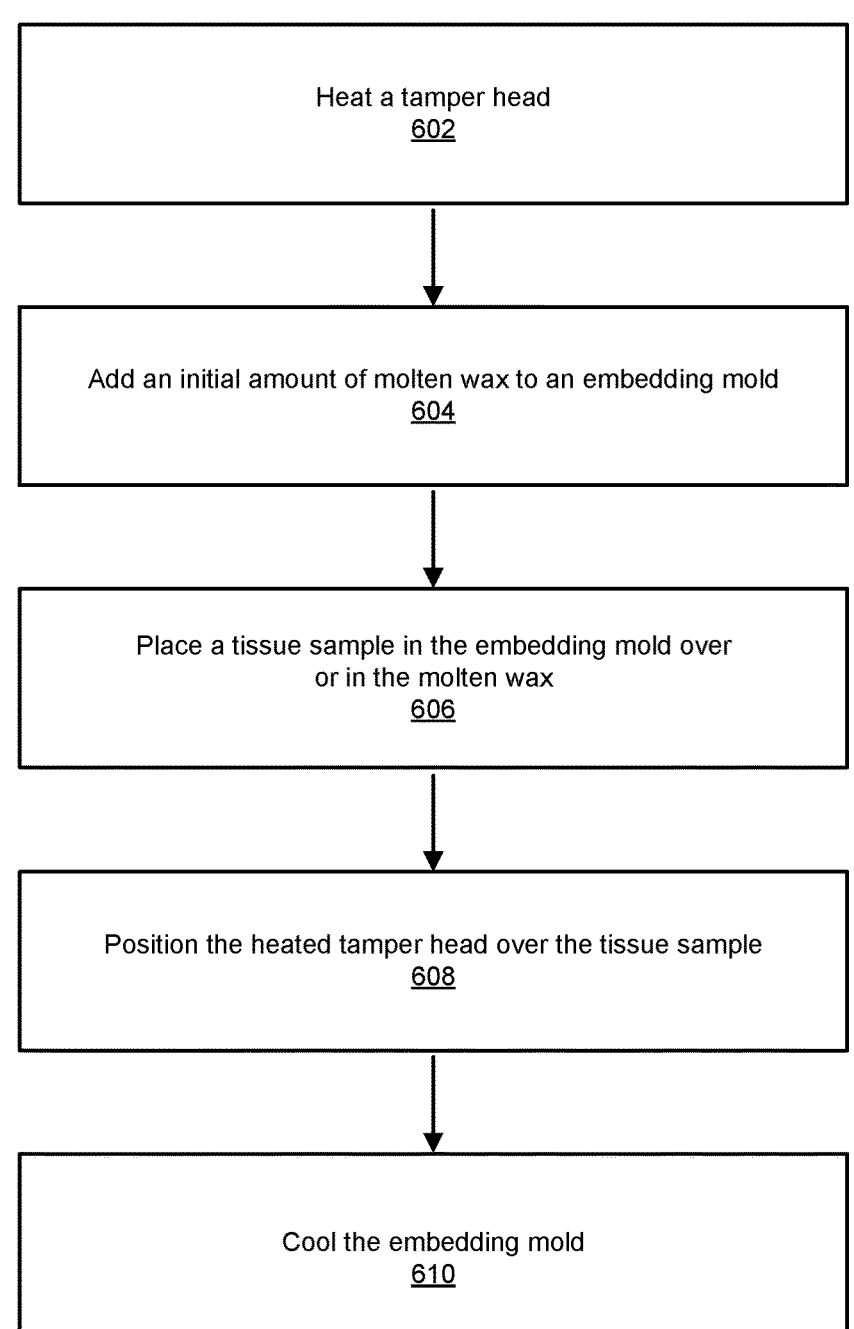
FIG. 6 is a flow chart illustrating a method of using a tamper for histopathology embedding, according to at least one embodiment of the present disclosure.

FIG. 6 is a flow chart illustrating a method 600 of using a tamper for histopathology embedding, according to at least one embodiment of the present disclosure. At operation 602, a tamper head may be heated, such as to a working temperature for an embedding process (e.g., between 42 and 68 degrees Celsius). The tamper head may be heated in any suitable manner, such as on a hot plate (e.g., a hot plate of the embedding station or on a dedicated smaller hot plate), with a thermoelectric device, with an electric induction coil, and/or in an oven.

At operation 604, an initial amount of molten wax (e.g., paraffin wax) may be added to an embedding mold.

At operation 606, a tissue sample may be placed in the embedding mold over or in the molten wax. The tissue sample may be a single piece of tissue, or multiple pieces of tissue.

At operation 608, the heated tamper head may be positioned over the tissue sample and molten wax to hold the tissue sample in place during a cooling process. The tamper head may be positioned over the tissue sample and molten wax prior to the molten wax becoming fully solidified, in order to use the tamper head to align the tissue sample(s) with each other and at a same or similar depth within the embedding mold. As explained above, the tamper head may be pliable and may include a phase change material, such as to increase a latent heat thereof.

At operation 610, the embedding mold with the initial amount of molten wax and the tissue sample therein may be cooled, such as on a cooling plate. The cooling may cause at least a portion of the molten wax to become solidified and to fix the tissue sample in place.

Accordingly, the present disclosure includes tampers that may have improved properties for histopathology embedding processes. The tampers may include a pliable tamper head including a pliable material (e.g., silicone rubber) and additives that improve thermal properties thereof. The additives may include a phase change material and/or a thermally conductive material, such as a metal material, a ceramic material, and/or a graphite material. Such configurations may enable the tamper to conform to tissue samples while inhibiting damage to the tissue samples while also maintaining temperature for improved performance and ease of use. Handles of the tampers may also be removable from the tamper heads, such as to heat the tamper heads without heating the handles for user comfort and/or to use different tamper heads with a single handle or different handles with a single tamper head.

The following example embodiments are also included in the present disclosure.

Example 1

A tamper for embedding tissue samples, which may include: a pliable tamper head including: a silicone rubber material; and a phase change material mixed into the silicone rubber material; at least one handle configured to couple to the tamper head; and a handle coupling for coupling the at least one handle to the tamper head.

Example 2

The tamper of Example 1, wherein the phase change material includes at least one of: a fatty acid; or a wax material.

Example 3

The tamper of Example 2, wherein the phase change material includes the fatty acid, wherein the fatty acid includes at least one of: caprylic acid, capric acid, lauric acid, myristic acid, palmitic acid, stearic acid, arachidic acid, behenic acid, lignoceric acid, cerotic acid, or a mixture thereof.

Example 4

The tamper of Example 2, wherein the phase change material includes the wax material, wherein the wax material includes at least one of: a natural wax or a synthetic wax.

Example 5

The tamper of any of Examples 1 through 4, wherein the tamper head further includes at least one metal material mixed into the silicone rubber material.

Example 6

The tamper of any of Examples 1 through 5, wherein the metal material includes at least one of: aluminum, copper, silver, a combination thereof, or an alloy thereof.

Example 7

The tamper of any of Examples 1 through 6, wherein the handle coupling includes a magnetic handle coupling.

Example 8

The tamper of Example 7, wherein the magnetic handle coupling includes a magnetic material or a magnetically sensitive material positioned within the tamper head

Example 9

The tamper of any of Examples 1 through 8, wherein the tamper head further includes a graphite material mixed into the silicone rubber material.

Example 10

The tamper of any of Examples 1 through 9, wherein the tamper head further includes a ceramic material mixed into the silicone rubber material.

Example 11

The tamper of Example 10, wherein the ceramic material includes at least one of: an oxide material; a nitride material; a carbide material; a boride material; or a polycrystalline diamond material.

Example 12

The tamper of any of Examples 1 through 11, wherein the tamper head includes: a lower layer exhibiting a first, high thermal conductivity; a core exhibiting a relatively high latent heat property; and a peripheral layer exhibiting a second, low thermal conductivity compared to the lower layer.

Example 13

The tamper of Example 12, wherein: the lower layer includes a higher weight percentage of conductive material than the peripheral layer; and the core includes a higher weight percentage of phase change material than the peripheral layer and the lower layer.

Example 14

The tamper of any of Examples 1 through 13, wherein the phase change material is at least one of: encapsulated in a polymer material; or absorbed in a porous matrix.

Example 15

A method of forming a tamper for embedding tissue samples, which method may include: mixing a silicone rubber material with a phase change material to form a tamper head; and coupling a handle to the tamper head.

Example 16

The method of Example 15, wherein coupling the handle to the tamper head includes removably coupling the handle to the tamper head.

Example 17

A method of using a tamper for histopathology embedding, which method may include: heating a tamper head including a pliable silicone rubber material and a phase change material mixed in the silicone rubber material; adding an initial amount of molten wax to an embedding mold; placing a tissue sample in the embedding mold over or in the molten wax; positioning the heated tamper head over the tissue sample and molten wax; and cooling the embedding mold with the initial amount of molten wax and the tissue sample therein.

Example 18

The method of Example 17, wherein heating the tamper head includes heating the tamper head to a temperature of between 42 and 68 degrees Celsius.

Example 19

The method of Example 17 or Example 18, wherein placing a tissue sample in the embedding mold includes placing multiple pieces of tissue in the embedding mold.

Example 20

The method any of Examples 17 through 19, wherein cooling the embedding mold with the initial amount of molten wax and the tissue sample therein includes solidifying at least a portion of the molten wax to fix the tissue sample in place.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A tamper for embedding one or more biological tissue samples, the tamper comprising:
   a pliable tamper head;
   at least one handle configured to couple to the pliable tamper head; and
   a handle coupling for coupling the at least one handle to the pliable tamper head, wherein the pliable tamper head comprises an amount of a phase change material mixed with an amount of a silicone rubber material, wherein the phase change material comprises a fatty acid or an amount of a wax material or both.

2. The tamper of claim 1, wherein the phase change material comprises the fatty acid and the fatty acid comprises at least one of: caprylic acid, capric acid, lauric acid, myristic acid, palmitic acid, stearic acid, arachidic acid, behenic acid, lignoceric acid, or cerotic acid.

3. The tamper of claim 1, wherein the phase change material comprises the wax material and and the wax material comprises: an amount of a natural wax or of a synthetic wax or both.

4. The tamper of claim 1, wherein the silicone rubber material comprises at least one metal mixed with the silicone rubber material.

5. The tamper of claim 4, wherein the at least one metal comprises at least one of: aluminum, copper, or silver.

6. The tamper of claim 1, wherein the handle coupling is a magnetic handle coupling.

7. The tamper of claim 6, wherein the magnetic handle coupling comprises an amount of a magnetic material or comprises an amount of a magnetically sensitive material positioned within the pliable tamper head.

8. The tamper of claim 1, wherein the silicone rubber material comprises an amount of graphite mixed with the silicone rubber material.

9. The tamper of claim 1, wherein the silicone rubber material comprises an amount of ceramic material mixed with the silicone rubber material.

10. The tamper of claim 9, wherein the ceramic material comprises at least one of:
    an oxide;
    a nitride;
    a carbide;
    a boride; or
    a polycrystalline diamond material.

11. The tamper of claim 1, wherein the tamper head comprises:
    a lower layer having a first thermal conductivity;
    a core having a specific latent heat; and
    a peripheral layer having a second thermal conductivity, wherein the first thermal conductivity is higher than the second thermal conductivity.

12. The tamper of claim 11, wherein:
    the lower layer comprises an amount of a conductive material and an amount of the phase change material and has a first conductive material weight percentage and a first phase change material weight percentage;
    the peripheral layer comprises an amount of the conductive material and an amount of the phase change material and has a second conductive material weight percentage and a second phase change material weight percentage; and the core comprises an amount of the conductive material and an amount of the phase change material and has a third conductive material weight percentage and a third phase change material weight percentage, wherein the first conductive material weight percentage is higher than the second conductive material weight percentage and the third phase change material percentage is higher than the first phase change material percentage and higher than the second phase change material percentage.

13. The tamper of claim 1, wherein the phase change material is encapsulated in a polymer material or is absorbed in a porous matrix or both.

14. A tamper for embedding one or more biological tissue samples, the tamper comprising:

a pliable tamper head;

at least one handle configured to couple to the pliable tamper head; and a handle coupling for coupling the at least one handle to the pliable tamper head, wherein the pliable tamper head comprises an amount of a phase change material mixed with an amount of a silicone rubber material, wherein the silicone rubber material comprises at least one of: at least one metal mixed with the silicone rubber material, an amount of graphite mixed with the silicone rubber material, or an amount of ceramic material mixed with the silicone rubber material.

15. A tamper for embedding one or more biological tissue samples, the tamper comprising:

a pliable tamper head;

at least one handle configured to couple to the pliable tamper head; and a magnetic handle coupling for coupling the at least one handle to the pliable tamper head, wherein the pliable tamper head comprises an amount of a phase change material mixed with an amount of a silicone rubber material.

16. A tamper for embedding one or more biological tissue samples, the tamper comprising:

a pliable tamper head;

at least one handle configured to couple to the pliable tamper head; and a handle coupling for coupling the at least one handle to the pliable tamper head, wherein the pliable tamper head comprises an amount of a phase change material mixed with an amount of a silicone rubber material, wherein the pliable tamper head comprises:

a lower layer having a first thermal conductivity;

a core having a specific latent heat; and a peripheral layer having a second thermal conductivity, wherein the first thermal conductivity is higher than the second thermal conductivity.

17. A tamper for embedding one or more biological tissue samples, the tamper comprising:

a pliable tamper head;

at least one handle configured to couple to the pliable tamper head; and a handle coupling for coupling the at least one handle to the pliable tamper head, wherein the pliable tamper head comprises an amount of a phase change material mixed with an amount of a silicone rubber material, wherein the phase change material is encapsulated in a polymer material or is absorbed in a porous matrix or both.

* * * * *